United States Patent
Jung et al.

(10) Patent No.: US 11,277,702 B2
(45) Date of Patent: Mar. 15, 2022

(54) METHOD AND APPARATUS FOR SOUND OBJECT FOLLOWING

(71) Applicant: LG ELECTRONICS INC., Seoul (KR)

(72) Inventors: Sungwon Jung, Seoul (KR); Tacksung Choi, Seoul (KR); Donghyun Kang, Seoul (KR); Seungsu Lee, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 16/812,183

(22) Filed: Mar. 6, 2020

(65) Prior Publication Data

US 2020/0288256 A1 Sep. 10, 2020

Related U.S. Application Data

(60) Provisional application No. 62/815,361, filed on Mar. 8, 2019.

(51) Int. Cl.
*G06K 9/00* (2006.01)
*H04S 3/00* (2006.01)
(Continued)

(52) U.S. Cl.
CPC .......... *H04S 3/008* (2013.01); *G06K 9/00718* (2013.01); *G06K 9/00744* (2013.01);
(Continued)

(58) Field of Classification Search
CPC . G06F 3/16; G06F 3/162; G06F 3/165; G06F 16/436; G06F 2203/11;
(Continued)

(56) References Cited

U.S. PATENT DOCUMENTS

2002/0048380 A1 4/2002 McGrath
2003/0053680 A1 3/2003 Lin et al.
(Continued)

FOREIGN PATENT DOCUMENTS

CN 104995681 10/2015
EP 0426272 5/1990
(Continued)

OTHER PUBLICATIONS

U.S. Appl. No. 16/812,199, Office Action dated Jan. 6, 2021, 20 pages.

(Continued)

*Primary Examiner* — Thomas H Maung
(74) *Attorney, Agent, or Firm* — Lee, Hong, Degerman, Kang & Waimey PC

(57) ABSTRACT

The present disclosure relates to a method and apparatus for processing a multimedia signal. More specifically, the present disclosure relates to a method comprising obtaining at least one video object from the multimedia signal and at least one audio object from the multimedia signal, extracting video feature information for the at least one video object and audio feature information for the at least one audio object, and determining a correlation between the at least one video object and the at least one audio object through an object matching engine based on the video feature information and the audio feature information, and an apparatus therefor.

19 Claims, 20 Drawing Sheets

(51) Int. Cl.
*G10L 25/24* (2013.01)
*G10L 25/57* (2013.01)
*H04R 29/00* (2006.01)

(52) U.S. Cl.
CPC .............. *G10L 25/24* (2013.01); *G10L 25/57* (2013.01); *H04R 29/001* (2013.01); *H04R 29/008* (2013.01); *G06K 9/00268* (2013.01); *H04S 2400/01* (2013.01)

(58) Field of Classification Search
CPC .... G06F 2203/011; G10L 25/24; G10L 25/51; G10L 25/57; G10L 21/0356; G10L 21/55; G10L 21/055; G10L 15/24; G10L 15/25; H04R 29/008; H04R 29/001; G06K 9/00718; G06K 9/00281; G06K 9/00335; H04S 7/00; H04S 7/30; H04S 7/301–307; H04S 7/40; H04S 2420/01; H04S 2420/11; H04S 2400/11; H04N 21/434–4358
See application file for complete search history.

(56) References Cited

U.S. PATENT DOCUMENTS

| | | | |
|---|---|---|---|
| 2004/0120554 A1* | 6/2004 | Lin | G06K 9/00335 |
| | | | 382/118 |
| 2005/0047624 A1 | 3/2005 | Kleen | |
| 2006/0059120 A1 | 3/2006 | Xiong et al. | |
| 2006/0165379 A1* | 7/2006 | Agnihotri | H04N 21/84 |
| | | | 386/231 |
| 2011/0007915 A1* | 1/2011 | Park | H04N 5/642 |
| | | | 381/306 |
| 2014/0233917 A1 | 8/2014 | Xiang | |
| 2014/0314391 A1* | 10/2014 | Kim | G11B 27/28 |
| | | | 386/248 |
| 2014/0343945 A1* | 11/2014 | Benhaim | G10L 15/18 |
| | | | 704/257 |
| 2015/0016641 A1* | 1/2015 | Ugur | G06F 3/167 |
| | | | 381/303 |
| 2017/0070835 A1 | 3/2017 | Silva | |
| 2017/0092280 A1* | 3/2017 | Hirabayashi | G11B 20/12 |
| 2017/0110139 A1* | 4/2017 | Peters | H04S 7/307 |
| 2017/0265016 A1* | 9/2017 | Oh | G06K 9/6215 |
| 2017/0364752 A1 | 12/2017 | Zhou et al. | |
| 2018/0005037 A1* | 1/2018 | Smith, IV | G10L 15/26 |
| 2018/0014135 A1* | 1/2018 | Chung | H04S 3/008 |
| 2018/0054689 A1* | 2/2018 | Chen | G06K 9/00718 |
| 2019/0058847 A1* | 2/2019 | Mayer | H04N 7/147 |
| 2019/0222798 A1* | 7/2019 | Honma | H04R 1/40 |
| 2019/0228229 A1* | 7/2019 | Cotoros | G06K 9/00718 |
| 2019/0313058 A1* | 10/2019 | Harrison | G06T 7/194 |
| 2020/0242507 A1* | 7/2020 | Gan | G06K 9/627 |
| 2021/0027779 A1* | 1/2021 | Kurasawa | G10L 15/22 |

FOREIGN PATENT DOCUMENTS

| | | |
|---|---|---|
| EP | 0426272 | 5/1991 |
| JP | 11313272 | 11/1999 |
| WO | 2010140254 | 12/2010 |

OTHER PUBLICATIONS

State Intellectual Property Office of the People's Republic of China Application Serial No. 202010092432.5, Office Action dated Mar. 1, 2021, 8 pages.
European Patent Office Application Serial No. 20160685.2, Search Report dated Jun. 26, 2020, 7 pages.
European Patent Office Application Serial No. 20160914.6, Search Report dated Jun. 29, 2020, 7 pages.
U.S. Appl. No. 16/812,199, Office Action dated Jun. 9, 2021, 22 pages.
European Patent Office Application Serial No. 20160914.6, Office Action dated Jul. 19, 2021, 5 pages.

* cited by examiner

METHOD AND APPARATUS FOR SOUND OBJECT FOLLOWING

CROSS REFERENCE TO RELATED APPLICATION(S)

Pursuant to 35 U.S.C. § 119(e), this application claims the benefit of U.S. Provisional Patent Application No. 62/815,361, filed on Mar. 8, 2019, the contents of which are hereby incorporated by reference herein in its entirety.

FIELD

The present disclosure relates to multimedia signal processing, and more particularly, to a method and apparatus for providing sound with a three-dimensional sound effect and a sense of immersion through an apparatus configured to output a video signal and an audio signal.

BACKGROUND

With advances in technology, devices equipped with a larger and higher-resolution display and multiple speakers have become widespread. In addition, research on video coding technology for transmitting and receiving more vivid images and audio coding technology for transmitting and receiving immersive audio signals has been actively conducted, and multimedia contents produced or created based on the video coding technology and audio coding technology are widespread. For example, content produced and supported based on High Efficiency Video Coding (HEVC) or H.265 standard is being distributed. Also, content ranging from stereo-based content to content supporting multi-channel or object-based audio standard such as Dolby Atmos (or content produced based on an object-based audio standard) is being distributed.

However, in case of adopting the conventional three-dimensional (3D) audio processing technology, the encoder delivers information about the location and motion of an sound source or an audio-related video object to the decoder over an audio bitstream, and the decoder operates to process an audio signal to produce a 3D effect based on the information about the location and motion contained in the audio bitstream. Thus, in the mixing process in producing audio content based on 3D audio processing technology, the audio mixing technician positions the sound source or the audio-related video object, and generates mixing parameters for providing a sense of space based on the location of the sound source or the video object. Then, the generated parameters are encoded with the object in a bitstream to produce audio content. Audio professionals need to measure and adjust the location and motion of the sound source or the audio-related video object very precisely and generate information about them to maximize the 3D effect in the encoding process. Accordingly, creating content based on the conventional 3D audio processing technology may take a lot of time and money. Further, it may be difficult to apply the conventional 3D audio processing technology to content for broadcasting and real-time streaming.

Thus, 3D audio processing technologies such as Dolby Atmos are limited to some content, such as movies, and not yet applied to most broadcast and streaming content. For audio content contained in most broadcast and streaming content, a sound image is not properly localized according to the location of the sound source or video object, and therefore the sense of immersion created is limited.

SUMMARY OF THE DISCLOSURE

Accordingly, the present disclosure is directed to a method and apparatus for sound object following that substantially obviate one or more problems due to limitations and disadvantages of the related art.

An object of the present disclosure is to provide a method and apparatus for localizing a sound image of an audio object based on the location of a video object related to the audio object to improve the sense of immersion regarding audio.

Another object of the present disclosure is to provide a method and apparatus for effectively determining a relationship between an audio object and a video object contained in a multimedia signal.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve the object of the present disclosure, in a first aspect of the present disclosure, provided herein is a method of processing a multimedia signal by an apparatus, the method comprising: obtaining at least one video object from the multimedia signal and at least one audio object from the multimedia signal; extracting video feature information for the at least one video object and audio feature information for the at least one audio object; and determining a correlation between the at least one video object and the at least one audio object through an object matching engine based on the video feature information and the audio feature information.

To achieve the object of the present disclosure, in a second aspect of the present disclosure, provided herein is an apparatus configured to process a multimedia signal, comprising: a memory storing instructions; and at least one processor operatively coupled to the memory and configured to, when executing the instructions, implement operations comprising: obtaining at least one video object from the multimedia signal and at least one audio object from the multimedia signal; extracting video feature information for the at least one video object and audio feature information for the at least one audio object; and determining a correlation between the at least one video object and the at least one audio object through an object matching engine based on the video feature information and the audio feature information.

Additionally or alternatively, determining the correlation between the at least one video object and the at least one audio object may comprise: obtaining information about a relationship between each of the at least one video object and a specific audio object of the at least one audio object through the object matching engine based on the video feature information and the audio feature information; and determining, from among the at least one video object, a specific video object related to the specific audio object based on the information about the relationship between each of the at least one video object and the specific audio object.

Additionally or alternatively, determining the specific video object related to the specific audio object may comprise: based on a value of the information about the relationship being greater than a predetermined value, determining a video object related to the value of the information about the relationship as the specific video object.

Additionally or alternatively, determining the specific video object related to the specific audio object may further comprise: based on the least one video object comprising a plurality of video objects, determining, from among the plurality of video objects, a video object related to a greatest value of the information about the relationship as the specific video object.

Additionally or alternatively, determining the specific video object related to the specific audio object may comprise: based on a value of the information about the relationship being less than a predetermined value, determining a video object related to the value of the information about the relationship as the specific video object.

Additionally or alternatively, determining the specific video object related to the specific audio object may further comprise: based on the least one video object comprising a plurality of video objects, determining, from the plurality of video objects, a video object related to a smallest value of the information about the relationship as the specific video object.

Additionally or alternatively, the information about the relationship may have a real number value.

Additionally or alternatively, the video feature information may be extracted based on a vertical length and a horizontal length of a lip skeleton.

Additionally or alternatively, the video feature information may be extracted based on: a ratio between a distance between a top boundary of a first rectangular region including a face and a top boundary of a second rectangular region including lips within the first rectangular region, a height of the second rectangular region, and a distance between a bottom boundary of the second rectangular region and a bottom boundary of the first rectangular region; and a ratio between a distance between a left boundary of the second rectangular region and a left boundary of the first rectangular region, a width of the second rectangular region, and a distance between a right boundary of the second rectangular region and a right boundary of the first rectangular region.

Additionally or alternatively, the audio feature information may be extracted based on linear prediction coding (LPC).

Additionally or alternatively, the audio feature information may be extracted based on a log-Mel filters-of-bank.

Additionally or alternatively, the audio feature information may be extracted based on Mel-frequency cepstral coefficients (MFCC).

Additionally or alternatively, the audio feature information may comprise onset information about the at least one audio object.

Additionally or alternatively, the object matching engine may comprise a model trained based on learning.

As is apparent from the following detailed description, the present disclosure can provide advantageous technical effects as follows.

According to the present disclosure, the sense of immersion may be improved regarding audio by localizing a sound image of an audio object based on the location of a video object related to an audio object.

In addition, according to the present disclosure, a relationship between an audio object and a video object contained in a multimedia signal may be effectively determined.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
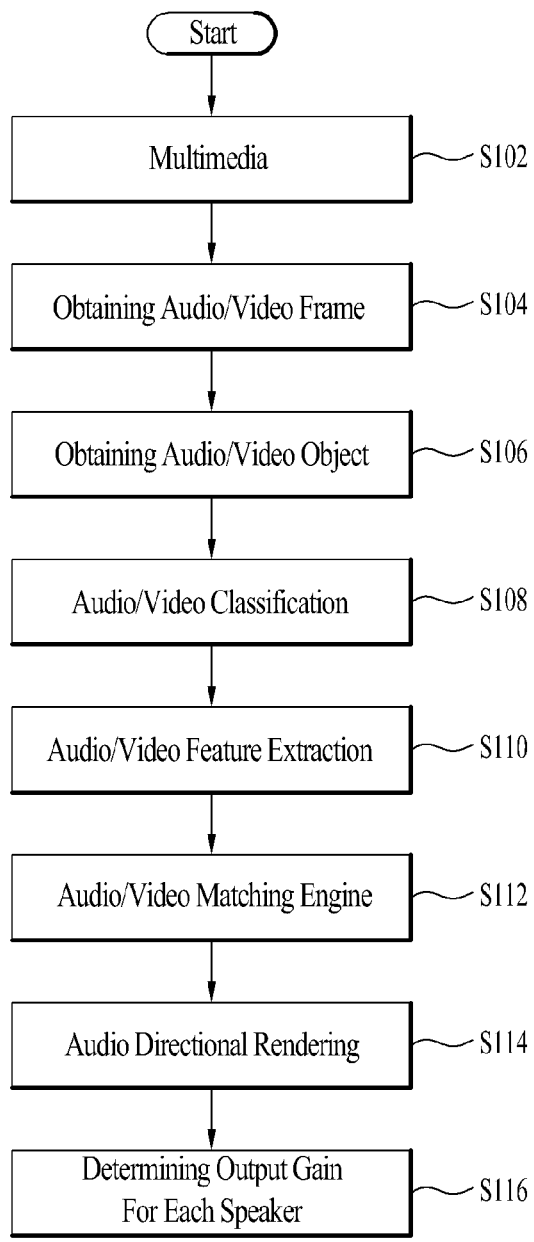
FIG. 1 illustrates an exemplary flowchart of a method proposed in the present disclosure.

Reference will now be made in detail to the preferred embodiments of the present disclosure, examples of which are illustrated in the accompanying drawings. Wherever possible, the same reference numbers will be used throughout the drawings to refer to the same or like parts.

In order to apply 3D audio processing technologies such as Dolby Atmos to broadcast or real-time streaming content, audio mixing technicians need to generate and transmit mixing parameters for 3D effects in real time. The current technology has a difficulty in performing real-time processing. In particular, in order to properly apply 3D audio processing technology such as Dolby Atmos, it is necessary to accurately identify the location of a loudspeaker set on the user (or decoder) side. However, and it is rarely possible for the content producer and supplier (or encoder) to identify all the information on the loudspeaker location in a typical house. Therefore, there is a technical difficulty in applying the conventional 3D audio processing technology to the audio content included in the broadcast or real-time streaming content. In addition, audio content contained in content that is not obtained by applying the conventional 3D audio processing technology (or content that is not produced or created based on the 3D audio processing technology) provides a greatly degraded sense of immersion because the sound image thereof is not properly localized according to the location of the sound source or video object.

Proposed herein is a method of localizing a sound image according to the location of a sound source or a video object related to audio content contained into content that is obtained by applying 3D audio processing technology (or content that is not produced or created based on the 3D audio processing technology) to improve the sense of immersion. Specifically, in the present specification, a method for sound object following is proposed. Sound object following may refer to a technique of recognizing the location of a thing (or an object) or a sound source that makes sound in an image or video and controlling/adjusting audio output to implement sound image localization based on the location of the thing (or an object) or sound source that makes sound.

The method for sound object following proposed in the present specification is a technique for improving the three-dimensional sound effect and the sense of immersion in an apparatus including a display and a speaker. In the proposed method of the present specification, a relationship between a single image object (or video object) or a plurality of image objects (or video objects) and a single sound object (or audio object) or a plurality of sound objects (or audio objects) is determined, and then the output rate (or gain) is controlled and/or adjusted such that the sound image of the related sound object (or audio object) is localized at the location of the image object (video object).

With the proposed method of the present disclosure, even when content that is not subjected to the conventional 3D audio processing technology is played back, a sound source or an image object (or video object) that makes a sound may be identified, the relevant audio signal may be output such that the sound image is localized at the location of the sound source or image object (or video object). Thereby, the sense of immersion may be improved. When the proposed method of the present disclosure is applied, the effect thereof may be further enhanced in an apparatus equipped with a large screen or a multi-channel speaker.

Artificial Intelligence (AI)

The proposed method of the present disclosure may be implemented based on AI. AI refers to a field of researching artificial intelligence or the methodology that may create artificial intelligence, and machine learning refers to a field of defining various problems in the AI field and researching methodologies for solving the problems. Machine learning is defined as an algorithm that improves performance of a task through a consistent experience of the task.

Artificial neural network (ANN) is a model used in machine learning, and may refer to overall problem-solving models composed of artificial neurons (nodes) forming a network by a combination of synapses. The ANN may be defined by a connection pattern between neurons of different layers, a learning process of updating a model parameter, and an activation function that generates an output value.

The ANN may include an input layer and an output layer, and optionally include one or more hidden layers. Each layer may include one or more neurons, and the ANN may include synapses that connect one neuron to another. In the ANN, each neuron may output a function value of an activation function of input signals input through a synapse, a weight, and a bias.

The model parameter refers to a parameter determined through learning and includes a weight of a synaptic connection and a bias of a neuron. A hyperparameter refers to a parameter to be set in the machine learning algorithm before learning, and includes a learning rate, the number of repetitions, a mini-batch size, and an initialization function.

The purpose of learning of the ANN may be to determine model parameters that minimize a loss function. The loss function may be used as an indicator for determining optimal model parameters in the learning process of the ANN.

Machine learning may be categorized into supervised learning, unsupervised learning, and reinforcement learning according to learning schemes.

Supervised learning may refer to a method of training the ANN with a label for learning data given. Here, the label may refer to a correct answer (or result value) that the ANN must infer when the learning data is input to the ANN. Unsupervised learning may refer to a method of training the ANN without a label for learning data given. Reinforcement learning may refer to a learning method that causes an agent defined in an environment to learn to choose an action or sequence of actions that maximizes cumulative reward in each state.

Machine learning implemented with a deep neural network (DNN) including a plurality of hidden layers among ANNs is referred to as deep learning, which is part of machine learning. In the following description, machine learning is used as a concept including deep learning.

Extended Reality (XR)

The proposed method of the present disclosure is applicable to extended reality (XR). XR collectively refers to virtual reality (VR), augmented reality (AR), and mixed reality (MR). VR technology provides only computer graphics (CG) images for real world objects, backgrounds, or the like, and AR technology provides virtual CG images on real object images. MR technology is CG technology that mixes and combines virtual objects in the real world.

MR technology is similar to AR technology in that it shows both real and virtual objects. However, the virtual object is used in a manner of complementing the real object in AR technology, whereas the virtual object and the real object have equal characteristics in the MR technology.

XR technology is applicable to a head-mount display (HMD), a head-up display (HUD), a mobile phone, a tablet, a laptop computer, a desktop PC, a TV, digital signage, etc. An apparatus to which XR technology is applied may be referred to as an XR device.

Proposed Method

FIG. 1 is an exemplary flowchart of a method proposed in the present disclosure. The flowchart illustrated in FIG. 1 is a non-limiting example and the proposed method of the present disclosure is not limited to the flowchart illustrated in FIG. 1. For example, in implementing the proposed method of the present disclosure, some of the operations illustrated in FIG. 1 may be omitted, and operations not illustrated in FIG. 1 may be included in the method. In addition, the execution order of some operations may be changed.

As described above, in the proposed method of the present disclosure, the output rate (or gain) of the speaker (or audio signal) is controlled and/or adjusted to output sound by localizing, at the location of a sound source or an image object (video object) making a sound, the location of an audio object related to the sound source or the image object (video object).

In S102, the apparatus may receive a multimedia signal. For example, a multimedia (e.g., audiovisual) signal may include a broadcast signal or a signal streamed in real time through YouTube. The multimedia signal may include, for example, a video signal and an audio signal. In the present disclosure, the video signal may be used as a term referring to a coded video bitstream or as a term referring to a signal obtained by decoding the coded video bitstream. Similarly, in the present disclosure, the audio signal may be used as a term referring to a coded audio bitstream or as a term referring to a signal obtained by decoding the coded audio bitstream.

Figure 2:
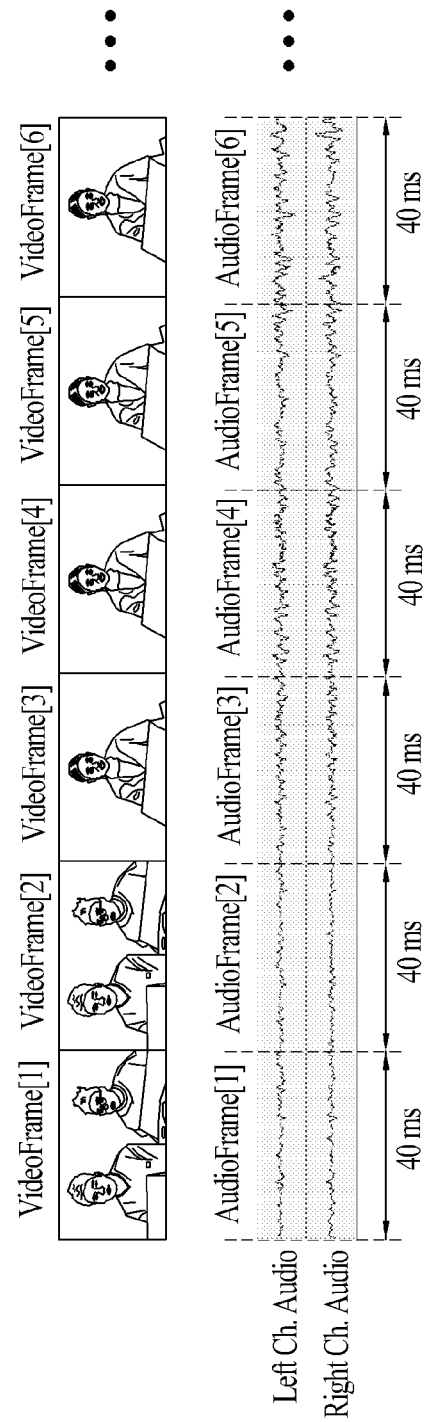
FIG. 2 illustrates an example of obtaining an audio frame and a video frame from a multimedia signal.

In S104, the apparatus may obtain an audio frame and a video frame from the multimedia signal. In detail, the multimedia signal may be divided into an audio frame and a video frame. The audio frame and the video frame may be obtained by separating the audio signal and the (still) image signal (or video signal) from a multimedia (e.g., audiovisual) signal successively at a predetermined time interval. For example, the audio frame may refer to an array of audio samples corresponding to a certain length of time, and the video frame may refer to a two-dimensional array of video samples at a specific time. For example, in S104, the apparatus may obtain an audio frame and a video frame from the multimedia signal as illustrated in FIG. 2.

Figure 3:
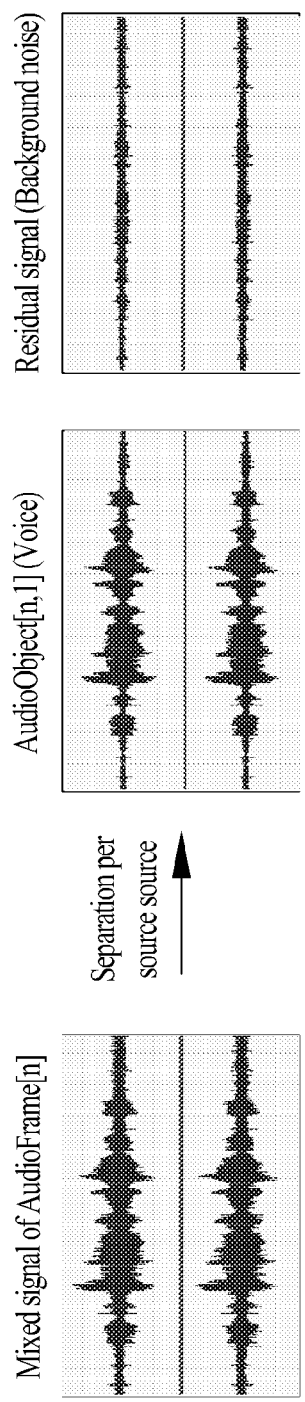
FIG. 3 illustrates an example of obtaining at least one audio object from an audio frame.
Figure 4:
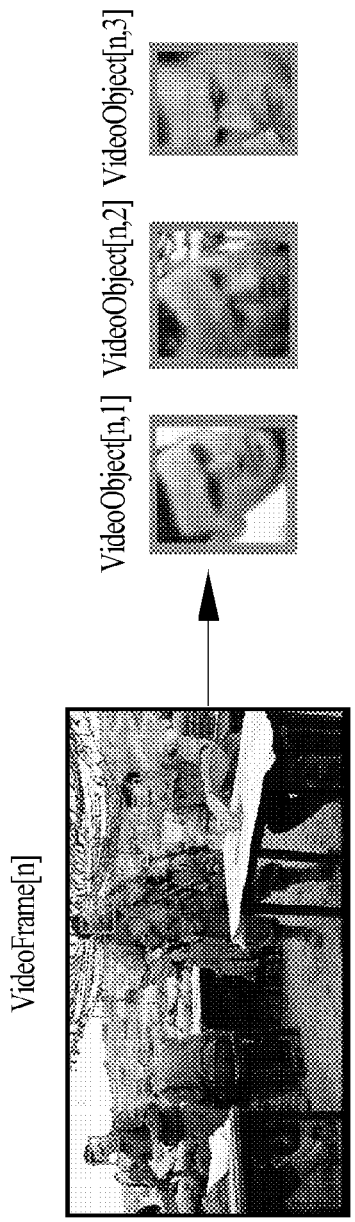
FIG. 4 illustrates an example of obtaining at least one video object from a video frame.

In S106, the apparatus may obtain at least one audio object from the audio frame and at least one video object from the video frame. In particular, the apparatus may obtain (or separate) a single audio object or a plurality of audio objects (or at least one audio object) from the audio frame. The audio signal of the audio frame is a mixed signal which is a mixture of signals generated by several different sound sources, a signal generated from a single sound source, or a "no sound" signal. An audio object is an audio signal that is separated and obtained from the audio frame. The apparatus may obtain (or separate) a single video object or a plurality of video objects (or at least one video object) from the video frame. The video frame is a (still) image obtained at a certain time interval. The (still) image may contain a human/animal and various kinds of object shapes. A video object is a (still) image block obtained by separating a region of a (still) image of the video frame. For example, in S106, the apparatus may obtain at least one audio object from the audio frame as illustrated in FIG. 3. For example, in S106, the apparatus may obtain at least one video object from the video frame as illustrated in FIG. 4. Additionally/alternatively, S106 may correspond to audio separation 512 and video object detection 530 of FIG. 5. In S106, the operation of the apparatus may include an operation described in relation to the audio separation 512 and the video object detection 530 of FIG. 5.

In S108, the apparatus may perform video classification on the at least one video object (obtained in S106) and audio classification on the at least one audio object (obtained in S106). That is, in S108, the apparatus classifies the objects (e.g., the audio object and/or the video object) obtained from the audio (or audio frame) and the video (or video frame). The audio classification may include determining a type of a sound source from which the audio object signal is generated. There is no limitation on the types of sound sources classified through the audio classification. The video classification may include determining a type of an object represented by the video object signal (or (still) image block). There is no limitation on the types of objects classified through the video classification. For example, in S108, the apparatus may perform audio classification on the audio object and perform video classification on the video object, as illustrated in FIG. 6. Additionally/alternatively, S108 may correspond to audio classification 518 and video classification 532 of FIG. 5. The operation of the apparatus in S108 may include an operation described in relation to the audio classification 518 and the video classification 532 of FIG. 5.

In S110, the apparatus may obtain feature information by performing feature extraction on the at least one video object and at least one audio object (obtained in S106). Multiple features may be extracted in S110. For example, S110 may correspond to audio feature extraction 518 and video feature extraction 532 of FIG. 5, and the operation of the apparatus in S110 may include an operation described in relation to the audio feature extraction 518 and the video feature extraction 532. Additionally/alternatively, the operation of the apparatus in S110 may include an operation described with reference to FIG. 7 and/or an operation described with reference to FIG. 8.

Figure 9:
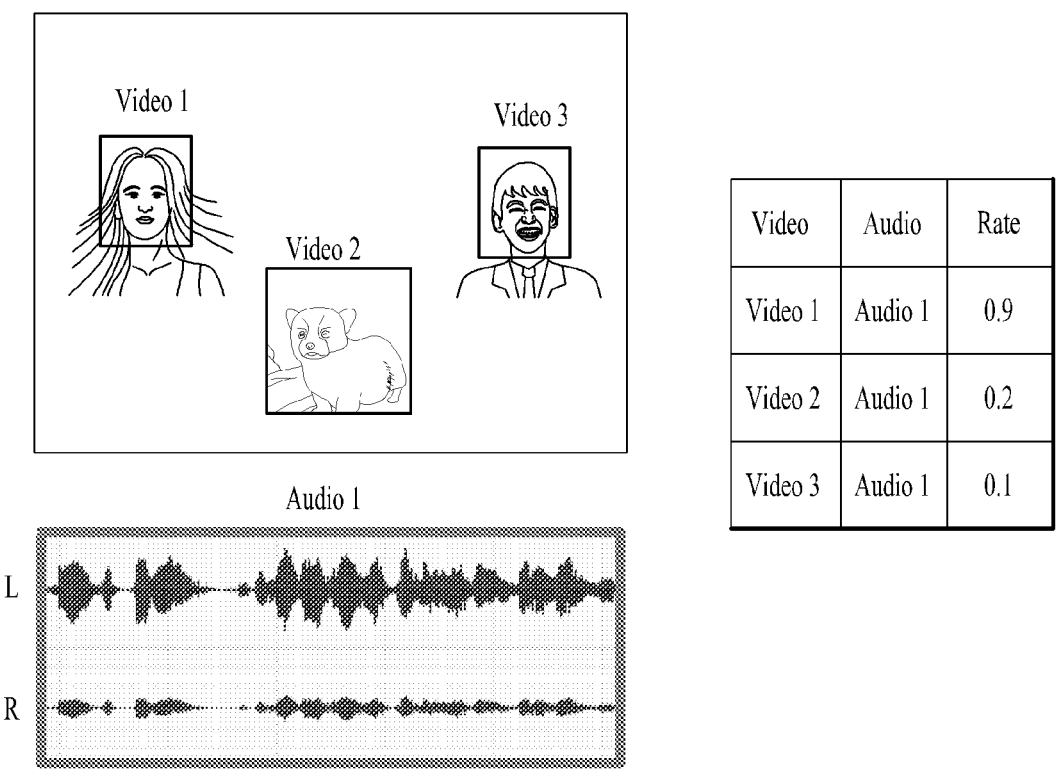
FIG. 9 illustrates an example of operation of an object matching engine.

In S112, the apparatus may determine a correlation between the at least one video object and the at least one audio object based on the feature information (obtained in S110) and an object matching engine. Specifically, the apparatus may input the features of the audio/video to the matching engine to determine a relationship therebetween. For example, in S112, the apparatus may determine a correlation between the at least one video object and the at least one audio object as illustrated in FIG. 9. Additionally/alternatively, S112 may correspond to the object matching engine 540 of FIG. 5, and the operation of the apparatus in S112 may include an operation described in relation to the object matching engine 540 of FIG. 5.

Figure 10:
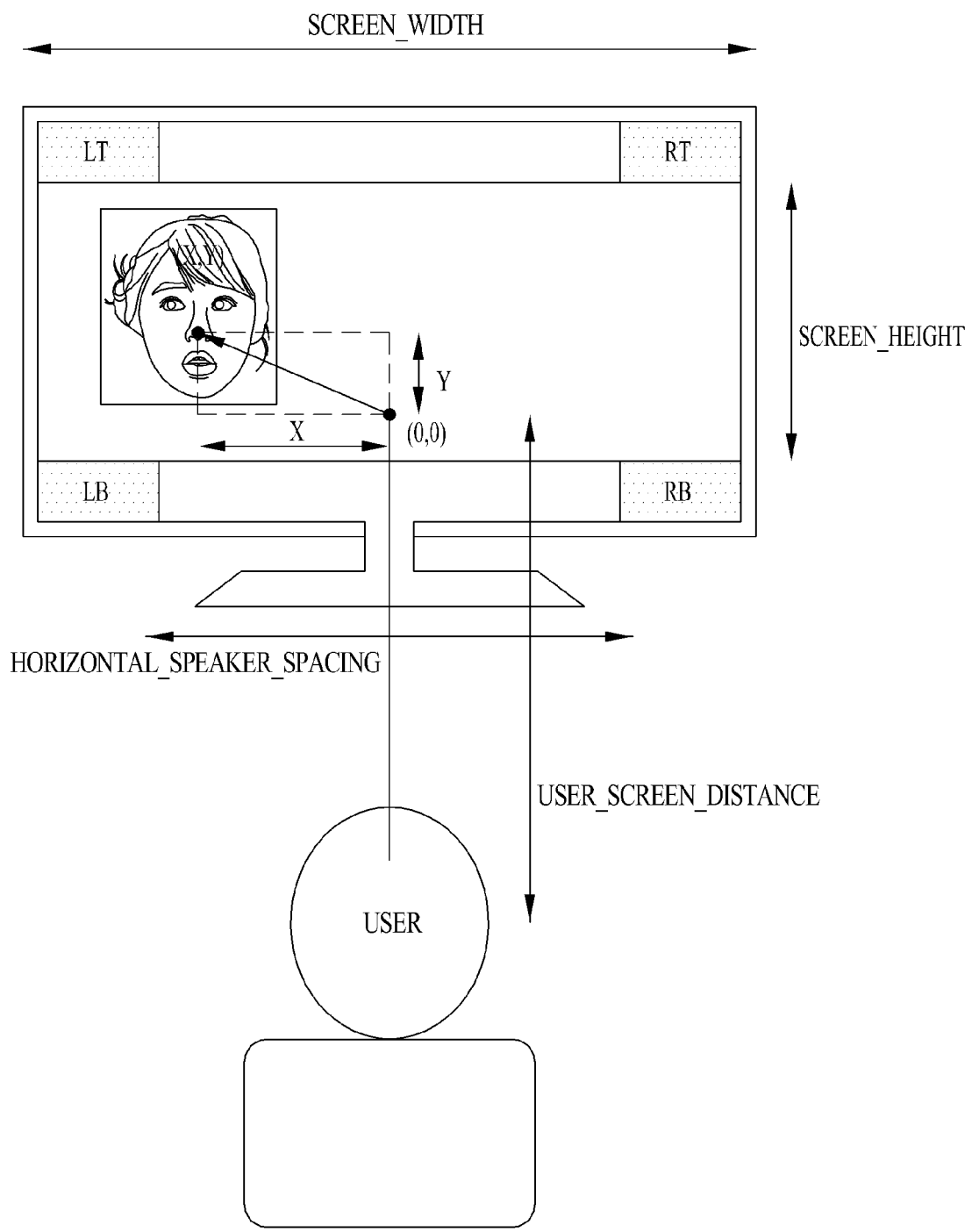
FIG. 10 illustrates an example of sound image localization according to a screen location of a video object.

In S116, the apparatus may perform directional rendering on a specific audio object based on a screen location of a video object related to a specific audio object according to the correlation (determined in S112). The directional rendering includes controlling and/or adjusting an output rate (or gain) of the speaker (or audio signal) according to the screen location of the video object when the object matching engine determines that the audio object sound source is a video object on the screen. For example, in S116, the apparatus may perform directional rendering on a specific audio object based on a screen location of a video object related to the specific audio object, as illustrated in FIG. 10. Additionally/alternatively, S116 may correspond to directional rendering 516 of FIG. 5, and the operation of the apparatus in S116 may include an operation described in relation to the directional rendering 516 of FIG. 5.

FIG. 2 illustrates an example of obtaining an audio frame and a video frame from a multimedia signal. The operation illustrated in FIG. 2 may be performed in S104 of FIG. 1. While it is illustrated in FIG. 2 that an audio frame and a video frame are obtained 25 times per second or at an interval of 40 ms, this is for illustrative purposes only. The proposed method is not limited to the example of FIG. 2.

The audio frame and the video frame are obtained by separating an audio signal and a (still) image signal from a multimedia (e.g., audiovisual) signal successively at a predetermined time interval. As the time interval between obtaining the audio frame and obtaining the video frame is shortened, the accuracy of determining the relationship between the audio object and the video object may be increased.

For example, referring to FIG. 2, when an audio frame and a video frame are obtained 25 times per second, that is, at an interval of 40 ms, one audio frame consisting of a 40 ms long audio signal and a video frame consisting of one (still) image are separately obtained every 40 ms.

The audio signal of the audio frame is a mixed signal which is a mixture of signals generated by several different sound sources, a signal generated from a single sound source, or a "no sound" signal. An audio object is an audio signal that is separated and obtained from the audio frame. For example, when the audio frame is a signal generated from a single sound source, one audio object may be obtained. For example, when the audio frame is a mixed signal, a plurality of audio objects may be obtained separately from the sound sources, respectively. Residual signals that cannot be separated for each sound source are processed on a separate immersive sound process path (see, for example, background and 514 of FIG. 5). The single audio object or multiple audio objects separated from the audio frame are used to analyze the relationship with the video object obtained from the video frame.

FIG. 3 illustrates an example of obtaining at least one audio object from an audio frame. The operation illustrated in FIG. 3 may be performed in S106 of FIG. 1. In the example of FIG. 3, it is assumed that one audio object (e.g., AudioObject [n, 1]) is obtained from one audio frame (e.g., AudioFrame [n]). However, the proposed method of the present disclosure is not limited thereto. The method may be applied even to a case where a plurality of audio objects are obtained from one audio frame.

For example, referring to FIG. 3, when a mixed signal of an audio frame (e.g., AudioFrame [n]) is composed of a voice generated from one sound source (e.g., a human) and background noise, one audio object (e.g., AudioObject [n, 1]) may be obtained by separating the human voice, and the background noise may be separated into a residual signal. AudioFrame[n] indicates the n-th audio frame, and AudioObject[n, 1] indicates the audio object obtained from the n-th audio frame.

A video frame is a (still) image obtained at a certain time interval, and the (still) image contains a human/animal and various other kinds of object shapes. A video object is a (still) image block obtained by separating a region of a (still) image of the video frame. The video object is a block obtained by separating only the region of an object from the whole (still) image region such that humans/animals and various types of objects may be clearly distinguished. When the image block of the video object is separated, the object may also be classified. For example, according to the proposed method of the present disclosure, a video object of a human/animal/vehicle, which may be a sound source, may be obtained. The video object of a human may include a still image block of a face or a lip portion that generates a voice.

FIG. 4 illustrates an example of obtaining at least one video object from a video frame. The operation illustrated in FIG. 4 may be performed in S106 of FIG. 1. In the example of FIG. 4, it is assumed that three video objects (e.g., VideoObject [n, 1], VideoObject [n, 2], and VideoObject [n, 3]) are obtained from one video frame (e.g., VideoFrame [n]). However, the proposed method of the present disclosure is not limited thereto and may be applied even to a case where a different number of video objects than the three video objects are obtained from one video frame.

A single video object or multiple video objects separated from the video frame are used to analyze the relationship between the video objects and an audio object obtained from the audio frame.

For example, referring to FIG. 4, in the n-th still image (e.g., VideoFrame [n]), image blocks of human face regions represented by three rectangular regions are separated, and then VideoObject[n, 1], VideoObject[n, 2], and VideoObject [n, 3] are obtained from the left to the right. VideoFrame[n] represents the n-th video frame, and VideoObject[n, 1], VideoObject[n, 2], and VideoObject[n, 3] represent a first video object, a second video object, and a third video object obtained from the n-th frame, respectively.

Figure 5:
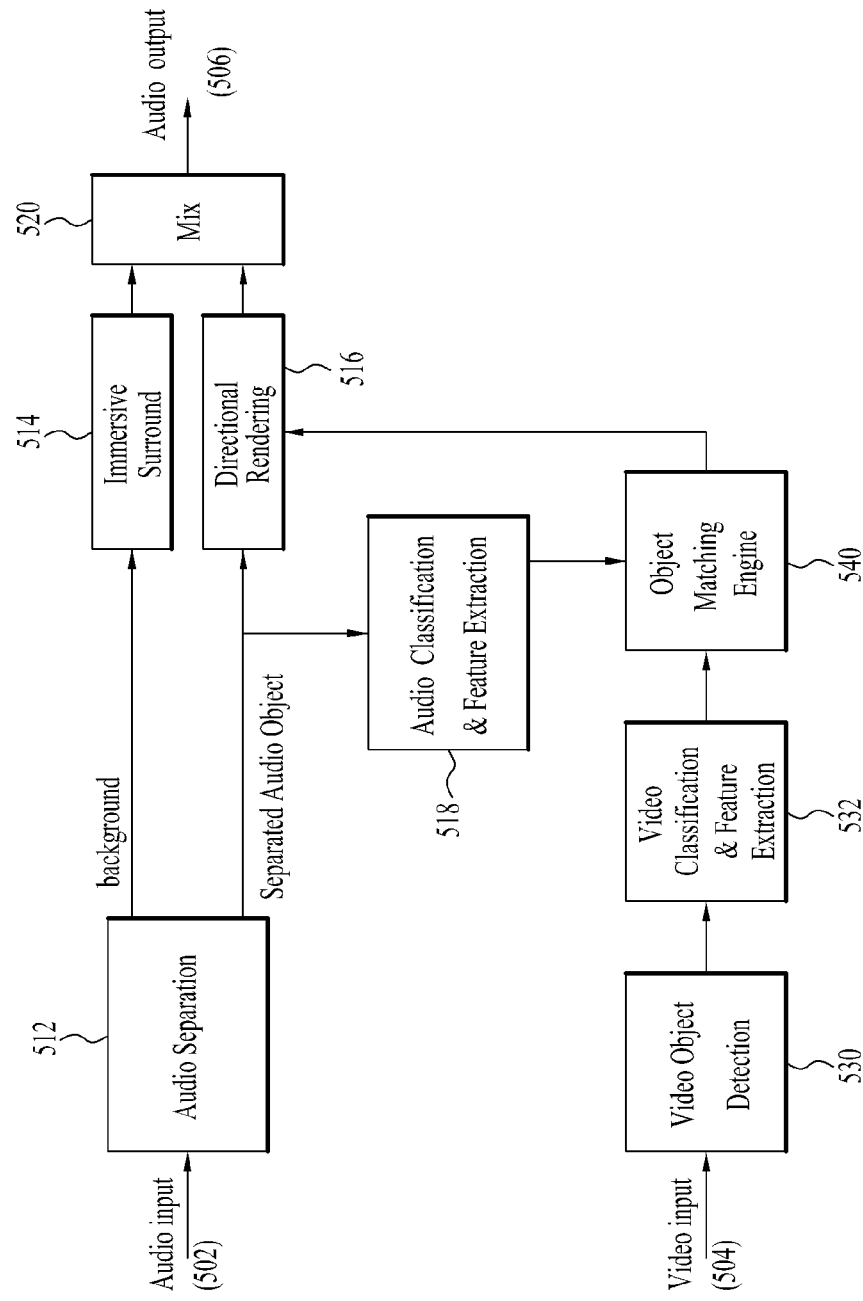
FIG. 5 illustrates a block diagram for sound object following according to the proposed method of the present disclosure.
Figure 6:
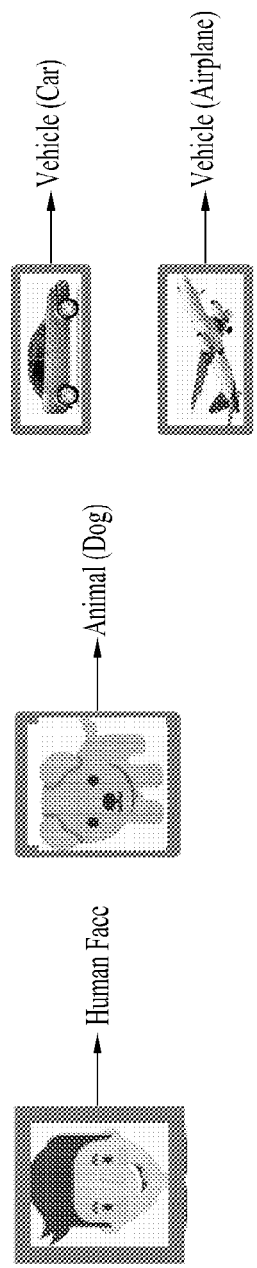
FIG. 6 illustrates an example of performing audio/video classification.

FIG. 5 illustrates a block diagram for sound object following according to the proposed method of the present disclosure.

In the example of FIG. 5, audio separation 512 includes an operation of separating (or demultiplexing (or De-mux)) an audio input signal 502 into an audio object and a residual signal (or background signal).

In the example of FIG. 5, immersive surround 514 is performed on a separated background signal or on an audio signal that is determined to have no relationship between audio and video by an object matching engine. The immersive surround may include processing of traditional stereo sound and surround sound.

In the example of FIG. 5, directional rendering 516 may include processing performed to output the audio signal (or separated audio object) at a specific screen location (by localizing the sound image of the audio signal (or separated audio object)) according to the correlation between the audio signal (or separated audio object) and the image object (video object). The directional rendering 516 controls and/or adjusts the output rate (or gain) of the speaker (or audio signal) according to the screen location to localize the sound image of the audio signal in terms of location. More specifically, the directional rendering 516 may include an operation of controlling and/or adjusting the output rate (or gain) of the speaker (or audio signal) through which the audio object is output, based on the location on the screen of the image object related to the audio signal (or the separated audio object). For example, the directional rendering 516 may correspond to S114 of FIG. 1.

In the example of FIG. 5, audio classification 518 is performed to determine the type of the sound source from which the audio object signal is generated. There is no limitation on the types of sound sources classified through the audio classification 518. The result of the audio classification 518 of the audio object may be used as an input feature of a matching engine 540 to determine the relationship between the audio object and the video object. For example, the audio classification 518 may correspond to S108 of FIG. 1.

For example, as illustrated in FIG. 6, the audio classification 518 may classify audio object signals into four distinct types, such as Human Speech, Animal Sound, Vehicle Sound, and Others. When the type of a sound source from which an audio object signal is generated cannot be determined, the signal may be classified into Others.

Video object detection 530 may be performed to detect at least one video object from a video input signal 504. As described above, the video object may include a (still) image block contained in the video frame. For example, the video object detection 530 may correspond to S106 of FIG. 1.

Video classification 532 is performed to determine a type of an object corresponding to the video object (still) image block. There is no limitation on the types of objects classified through the video classification 532. The result of the video classification 532 of the video object may be used as an input feature of the matching engine 540 to determine the relationship between the audio object and the video object. For example, the video classification 532 may correspond to S108 of FIG. 1.

For example, as illustrated in FIG. 6, the video classification 532 may classify video objects into four types, such as Human Face, Animal, Vehicle, and Others. When the type of a video object cannot be determined, the video object may be classified into Others.

In the example of FIG. 5, the object matching engine 540 is a model learned using deep learning (DL), machine learning (ML), reinforcement learning, or the like based on feature values of audio and video, which are input values. For example, the object matching engine may include a model that has already been trained by learning such as DL, ML, or reinforcement learning based on a vast amount of data and an ANN. For example, the object matching engine 540 may correspond to S112 of FIG. 1.

The procedure of extracting useful components from audio and video is referred to as feature extraction. In the example of FIG. 5, feature extraction 518, 532 is performed on at least one audio object and at least one video object through the feature extraction 518, 532 to obtain feature values. The feature values may be referred to as feature information. For example, the feature extraction 518, 532 may correspond to S110 of FIG. 1.

In the audio feature extraction 518, an audio feature value may be obtained or extracted using various methods conventionally used in speech recognition or audio recognition. Additionally/alternatively, the audio feature value may include audio onset information for determining whether speech has been made.

Representative examples of conventional speech recognition techniques include LPC, Log-mel, and MFCC. LPC stands for linear prediction coding, which is a speech generation model that generates speech through an LPC filter using a certain periodic pulse sequence and white Gaussian noise as an excitation source.

Log-mel is a unit that represents the nonlinear frequency characteristics of the human ear. That is, a human has a high resolution in the low frequency region and a low resolution in the high frequency region, which exhibits a logarithmic characteristic in the frequency band. The magnitude or power of a spectrum may be estimated by performing Fourier transform (e.g., Fast Fourier Transform (FFT)) on samples of an audio section, and then used to obtain log-Mel by filters-of-bank configured in Mel-scale.

MFCC stands for Mel-frequency cepstral coefficients. MFCC may be obtained using a cepstral transform, which removes the correlation in the log-Mel.

In video feature extraction 532, a video feature value may be obtained or extracted using various methods conventionally used for video object recognition. Additionally/alternatively, the video feature value may be obtained or extracted using a face box, a lip skeleton, and/or a comparison value of the values thereof.

Figure 7:
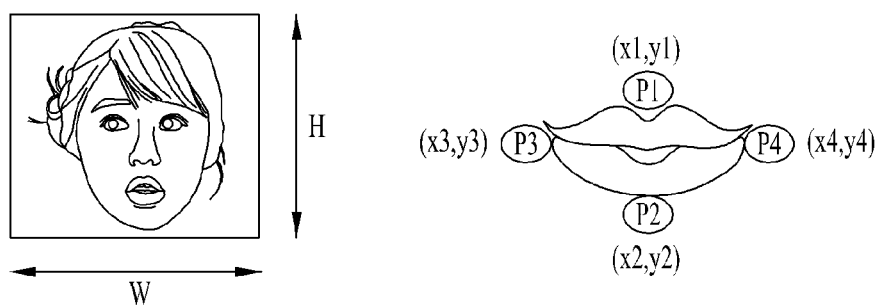
FIGS. 7 and 8 illustrate an example of performing feature extraction on a video object.

For example, FIG. 7 illustrates an example of obtaining or extracting a video feature value based on a face box and a lip skeleton. As illustrated in FIG. 7, whether the face of a human is recognized is determined, and the height H and the horizontal length W of the face box are determined. The face box refers to a rectangular region determined based on face recognition, the height of the face box refers to the height of this rectangular region, and the horizontal length of the face box refers to the width of this rectangular region. H and W may be used to normalize vertical and horizontal values of the lips (see, for example, Equation 1). The vertical and horizontal lengths of the lips are determined using the information obtained from the lip skeleton. By comparing the vertical and horizontal lengths of the lips according to the video frames, it may be determined whether the lips move. By comparing the current frame with a previous frame regarding movement of the lips, information on the amount of movement of the lips may be obtained.

More specifically, in the example of FIG. 7, the video feature value may be obtained or extracted based on Equation 1. In Equation 1, H denotes the height of the face box, W denotes the width of the face box, D1 denotes the vertical length of the lip skeleton, D2 denotes the horizontal length of the lip skeleton, d1 denotes a normalized value of vertical lengths of the lip skeleton based on the height H of the face box, d2 denotes a normalized value of the horizontal length of the lip skeleton based on the width W of the face box, n denotes a frame number, and M1 denotes the difference in vertical length of the lip skeleton between the current frame n and the previous frame n−1, M2 denotes the difference in vertical length of the lip skeleton between the current frame n and the previous frame n−1, A1 denotes the difference between the M1 value in the current frame n and the M1 value in the previous frame n−1, and A2 denotes the difference between the M2 value in the current frame n and the M2 value in the previous frame n−1.

$$D1 = \sqrt{(x1-x2)^2 + (y1-y2)^2}$$
$$D2 = \sqrt{(x3-x4)^2 + (y3-y4)^2}$$
$$d1 = \frac{D1}{H} \quad d2 = \frac{D2}{W}$$
$$M1(n) = D1(n) - D1(n-1),$$
$$n = \text{frame Number}$$
$$M2(n) = D2(n) - D2(n-1)$$
$$A1(n) = M1(n) - M1(n-1)$$
$$A2(n) = M2(n) - M2(n-1)$$

[Equation 1]

In Equation 1, M1 represents a result of comparison between the vertical lengths of the lips in video frames, M2 represents a result of comparison between the horizontal lengths of the lips in video frames, and A1 and A2 represent information on the amount of movement of the lips determined by comparing the movement of the lips with the previous frame. In Equation 1, at least one of M1, M2, A1, and A2 may be used as a video feature value.

Figure 8:
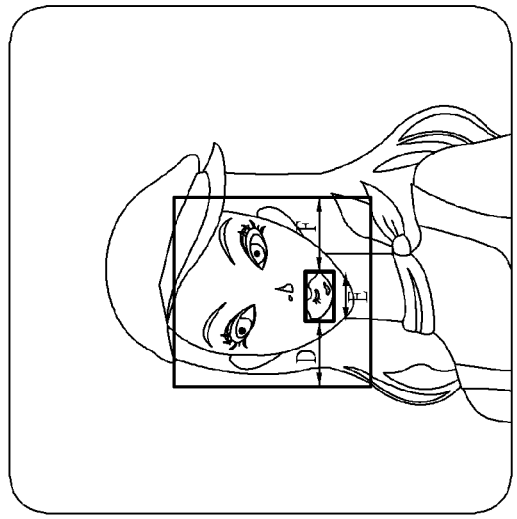
Figure 8:
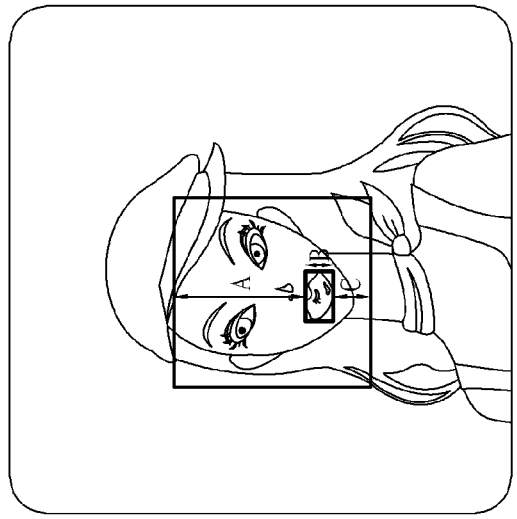

As another example, referring to FIG. 8, a lip position ratio (e.g., A:B:C, D:E:F) in the face box may be used as a video feature value. Specifically, when the face box is referred to as a first rectangular region and the rectangular region containing the lip skeleton is referred to as a second rectangular region, the video feature value may include a ratio between a distance between the top boundary of the second rectangular region in the first rectangular region and the top boundary of the first rectangular region (e.g., A in FIG. 8), the height of the second rectangular region (e.g., B in FIG. 8), a distance between the bottom boundary of the second rectangular region and the bottom boundary of the first rectangular region (e.g., C in FIG. 8) (e.g., A:B:C), and a ratio between a distance between the left boundary of the second rectangular region and the left boundary of the first rectangular region (e.g. D in FIG. 8), the width of the second rectangular region (e.g. E in FIG. 8), and a distance between the right boundary of the second rectangular region and the right boundary of the first rectangular region (e.g., F in FIG. 8) (e.g., D:E:F), or may be obtained based on these ratios.

For example, video feature values may be obtained or extracted by normalizing the lip position ratio (e.g., A:B:C, D:E:F).

In the proposed method of the present disclosure, the video feature values described with reference to FIG. 7 and the video feature values described with reference to FIG. 8 may be used independently or in combination. Accordingly, at least one of the video feature values described with reference to FIG. 7 and the video feature values described with reference to FIG. 8 may be used as an input to the object matching engine 540.

Referring back to FIG. 5, when feature values for an audio signal (or an audio object) and a video signal (or a video object) obtained or extracted from a multimedia signal such as broadcast or YouTube are input to the object matching engine 540, which is a model trained using the audio and video feature values as input values, the degree of relationship between the audio signal (or the audio object) and the video signal (or the video object) may be obtained or determined. For example, the degree of relationship between an audio object and a video object may be expressed as a (real number) value, which may be referred to as a rate, correlation, information indicating the degree of relationship, information about the relationship, or the like. The object matching engine 540 may perform and operation of determining the degree of relationship (or obtaining information indicating the degree of relationship) between the audio/video objects based on the results of the classification 518, 532 of audio/video objects and/or the results of the feature extraction 518, 532 for the audio/video objects (using a model already trained by DL, ML, reinforcement learning, etc.).

FIG. 9 illustrates an example of operation of the object matching engine 540. In FIG. 9, it is assumed that three video objects (e.g., Video1, Video2, Video3) are obtained from one video frame, and one audio object (e.g., Audio1) is obtained from one audio frame. However, the method is not limited thereto and may be applied even to a case where the numbers of obtained video objects and/or audio objects are different from the assumption.

Referring to FIG. 9, when three video objects (e.g., Video1, Video2, Video3) are obtained from a video (or video frame) on one screen, the objects are classified into the corresponding classes. Video1 and Video3 are classified into a class of Human, and Video2 is classified into a class of Animal. Audio1 is an audio signal (or audio object) obtained by removing the background sound from the original sound. When feature values are extracted from the video objects (e.g., Video1, Video2, Video3) and the audio object (e.g., Audio1) and provided to the object matching engine 540 as inputs, the object matching engine 540 outputs a degree of relationship as a rate. In the example of FIG. 9, a higher rate may mean a higher degree of relationship between the video and the audio. Alternatively, it may configured such that a lower rate means a higher degree of relationship between the video and the audio.

For example, based on a value of the information indicating the degree of relationship (or the information about the relationship) (e.g., the rate) being greater than a predetermined value, a video object related to the value of the information indicating the degree of relationship (or the information about the relationship) (e.g., the rate) may be determined as the video object related to the audio object (e.g., Audio1). Additionally/alternatively, when there are multiple video objects as in the example of FIG. 9, a video object (Video1) related to the greatest value (e.g., 0.9) of the information indicating the degree of relationship (or the information about the relationship) (e.g., the rate) may be determined as the video object related to the audio object (e.g., Audio1).

As another example, based on a value of the information indicating the degree of relationship (or the information about the relationship) (e.g., the rate) being less than a predetermined value, a video object related to the value of the information indicating the degree of relationship (or the information about the relationship) (e.g., the rate) may be determined as the video object related to the audio object (e.g., Audio1). Additionally/alternatively, when there are multiple video objects as in the example of FIG. 9, a video object (Video3) related to the smallest value (e.g., 0.1) of the information indicating the degree of relationship (or the information about the relationship) (e.g., the rate) may be determined as the video object related to the audio object (e.g., Audio1).

Referring back to FIG. 5, the directional rendering 516 may include controlling and/or adjusting the output rate (or gain) of the speaker (or audio signal) according to the screen location of a video object when the object matching engine 540 determines that the audio object sound source or the sound-producing object is the video object on the screen. For example, referring to the example of FIG. 4, when the object matching engine 540 determines that VideoObject[n, 3] is related to the audio object, the directional rendering 516 may be performed to control and/or adjust the output rate (or gain) of the speaker (or audio signal) according to the screen location of VideoObject[n, 3].

The output rate (or gain) of each speaker is controlled and/or adjusted for sound image localization at the screen location of the video object with respect to the user. The number of speakers whose output rate (or gain) is controlled and/or adjusted is greater than or equal to 2. Depending on the size of the apparatus, the location of the user, and the number and arrangement of the speakers, the output rate for sound image localization may be changed.

FIG. 10 illustrates an example of sound image localization performed by an apparatus including four speakers according to a screen location of a video object. FIG. 10 is merely an example, and the proposed method of the present disclosure may be applied to an apparatus including different numbers of speakers in the same manner/a similar manner.

For example, referring to FIG. 10, when four speakers are disposed on the left top LT/right top RT/left bottom LB/right bottom RB of a TV, and of sound image localization is to be performed at the position of coordinates (X, Y) with respect to the screen center coordinates (e.g., (0,0)) for the screen width (e.g., SCREEN WIDTH) and the screen height (e.g., SCREEN HEIGHT), the output rates (or gains) GLT/GRT/GLB/GRB for the speaker positions LT/RT/LB/RB may be determined as follows. Here, LT denotes the left top, RT denotes the right top, LB denotes the left bottom, RB denotes the right bottom, GLT denotes a gain of the left top, GRT denotes a gain of the right top, GLB denotes a gain of the left bottom, and GRB denotes a gain of the right bottom.

The horizontal output rate for the coordinate X and the vertical output rate for the coordinate Y are determined based on the "distance between the user and the screen (e.g., USER_SCREEN_DISTANCE in FIG. 10), the horizontal speaker spacing (e.g., HORIZONTAL_SPEAKER_SPACING in FIG. 10), the screen width (e.g., SCREEN_WIDTH in FIG. 10), the screen height (e.g., SCREEN_HEIGHT in FIG. 10)," and GLT, GRT, GLB, GRB are determined such that GLT+GRT+GLB+GRB is equal to a constant value based on the horizontal output rate and the vertical output rate.

Figure 11:
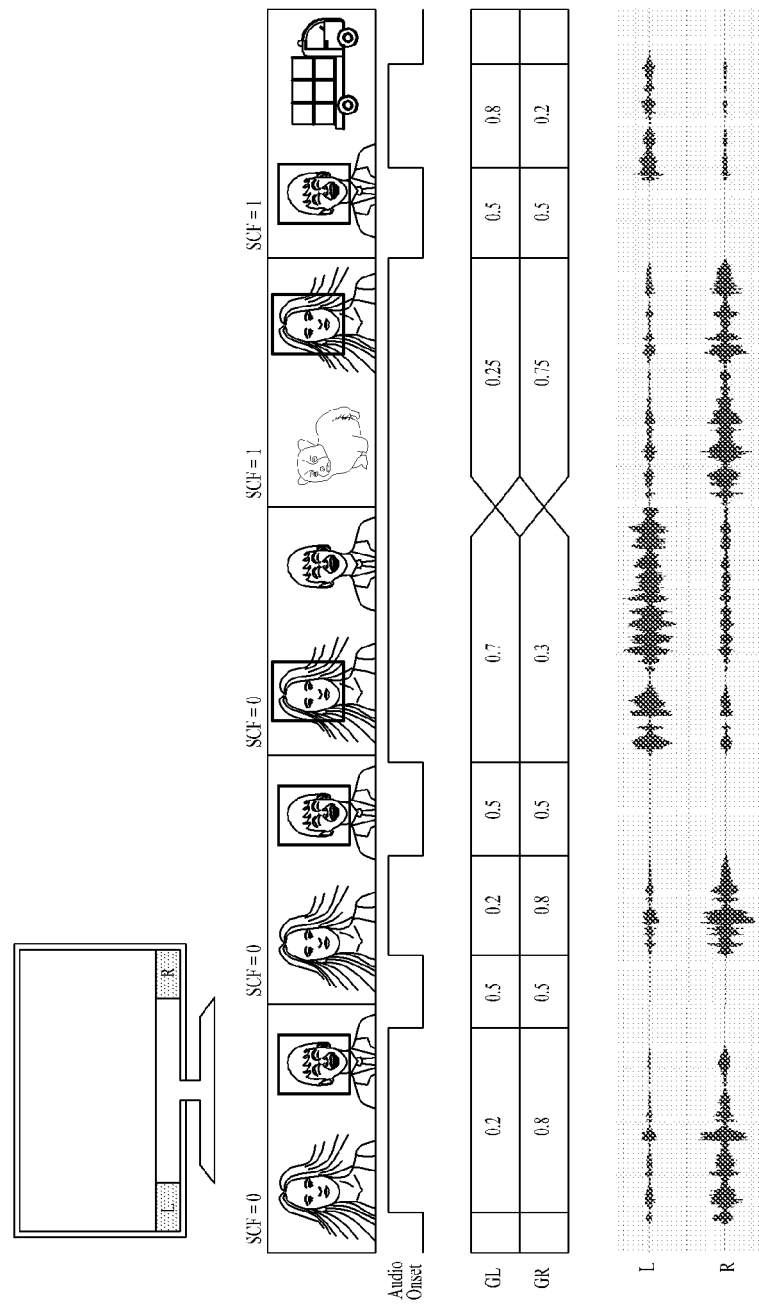
FIGS. 11 and 12 illustrate examples of operation of sound object following.
Figure 12:
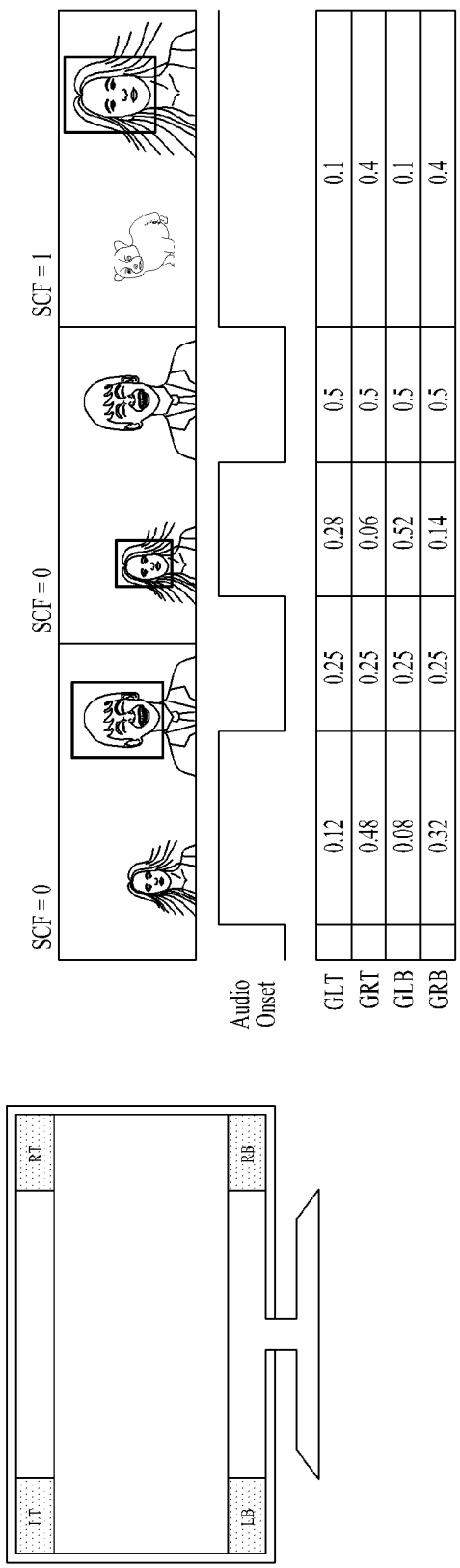

FIGS. 11 and 12 illustrate examples of operation of sound object following when there are two or four speakers, respectively. SCF denotes a scene change flag, and GL and GR denote a gain of left audio and a gain of right audio. Audio Onset denotes the probability of presence of a sound output of an audio object. For example, for a human speech, whether a human is speaking is indicated by a probability between 0 (not speaking) and 1 (speaking). The human face is detected, and the location of the human face is determined through analysis of the correlation between the detected human face and the speech. Then, the left and right speech signal output gains are controlled and/or adjusted such that the speech is output at the position where the human face is located. The sum of the output rates of the outputs from all speakers should be 1. By increasing the output of a speaker with a higher correlation between audio and video, sound may be provided with an improved 3D effect and improved sense of immersion. The output rate may be tuned according to the display size of the apparatus, the number and arrangement of speakers of the apparatus, and sound characteristics.

Referring back to FIG. 5, the mixing 520 may be performed to mix the signal processed in the immersive surround 514 and the signal processed in the directional rendering 516 to generate an audio output signal 506.

Structure of Apparatus

Figure 13:
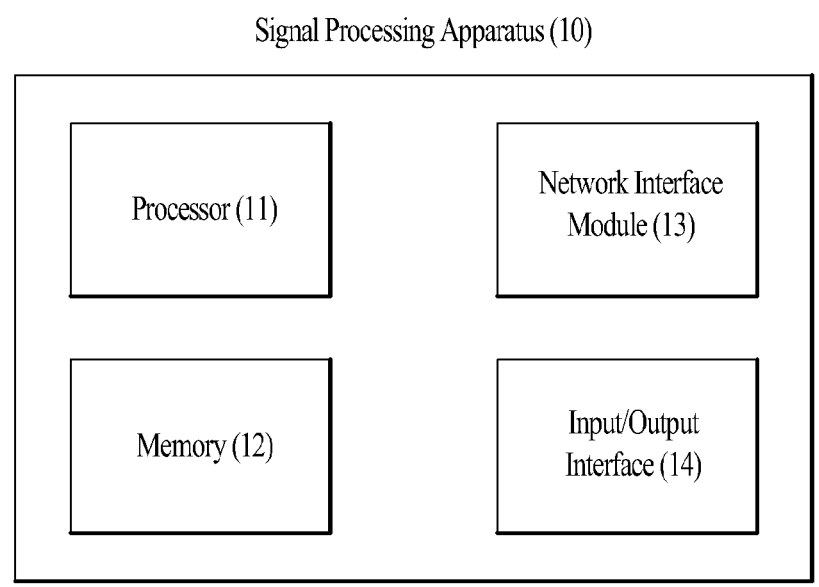
FIG. 13 illustrates a block diagram of an apparatus to which the present disclosure is applicable.

FIG. 13 illustrates a block diagram of a signal processing apparatus to which the present disclosure may be applied. The apparatus 10 according to the invention may be configured to process signals including a video signal and an audio signal according to the invention. For example, the signal processing apparatus 10 to which the present invention may be applied may include a mobile terminal such as a smartphone, a portable device such as a laptop computer, a home appliance such as a digital TV and a digital video player, and a transportation means such as an automobile. As another example, the signal processing apparatus 10 to which the present invention may be applied may be included as part of an application specific integrated circuit (ASIC) implemented in the form of a system on chip (SoC).

The memory 12 may store a program for processing and controlling of the processor 11, and may store a bitstream including a video signal and an audio signal, a decoded video signal, a decoded audio signal, control information necessary for signal processing, temporary data generated during signal processing, and the like. In addition, the memory 12 may be utilized as a buffer for various kinds of video and audio signals. The memory 12 may be implemented as a storage device, such as a read only memory (ROM), a random access memory (RAM), an erasable programmable read only memory (EPROM), an electrically erasable programmable read-only memory (EEPROM), a flash memory, a static RAM (SRAM), a hard disk drive (HDD), a solid state drive (SSD), or the like.

The processor 11 controls the operation of each module in the signal processing apparatus. In particular, the processor 11 may perform various control functions for performing the signal processing method according to the present invention. The processor 11 may also be referred to as a controller, a microcontroller, a microprocessor, a microcomputer, or the like. The method according to the invention may be implemented by hardware, firmware, software, or a combination thereof. When the present invention is implemented using hardware, an application specific integrated circuit (ASIC) or a digital signal processor (DSP), a digital signal processing device (DSPD), a programmable logic device (PLD), and a field programmable gate array (FPGA) configured to carry out the present invention may be provided in the processor 11. In implementing the method according to the present invention using firmware or software, the firmware or the software may be configured to include a module, a procedure or a function for performing the functions or operations of the present invention. The firmware or software configured to perform the method according to the present invention may be stored in the memory 12 or stored in a computer readable recording medium (not shown) separately from the memory 12 and cause the apparatus 10 to perform the method according to the invention when executed by the processor 11.

In addition, the apparatus 10 may optionally include a network interface module (NIM) 13. The NIM 13 may be operatively connected to the processor 11, and the processor 11 may control the NIM 13 to transmit or receive, over a wireless/wired network, a wireless/wired signal for carrying information and/or data, signals, and messages. The NIM 13 may support various communication standards such as, for example, IEEE 802 series, 3GPP LTE(-A), 3GPP 5G, Wi-Fi, Advanced Television System Committee (ATSC), and Digital Video Broadcasting (DVB). In accordance with the communication standard, video and audio signals such as control information and/or an encoded bitstream may be transmitted and received. The NIM 13 may not be included in the apparatus as needed.

In addition, the apparatus 10 may optionally include an input/output interface 14. The input/output interface 14 is operatively connected with the processor 11, and the processor 11 may control the input/output interface 14 to receive or output a control signal and/or a data signal. The input/output module 14 may support standards such as, for example, Universal Serial Bus (USB), Bluetooth, Near Field Communication (NFC), serial/parallel interface, Digital Visual Interface (DVI), and High Definition Multimedia Interface (HDMI) so as to be connected to, for example, an input device such as a keyboard, a mouse, a touch pad, or a camera, and an output device such as a display.

Figure 14:
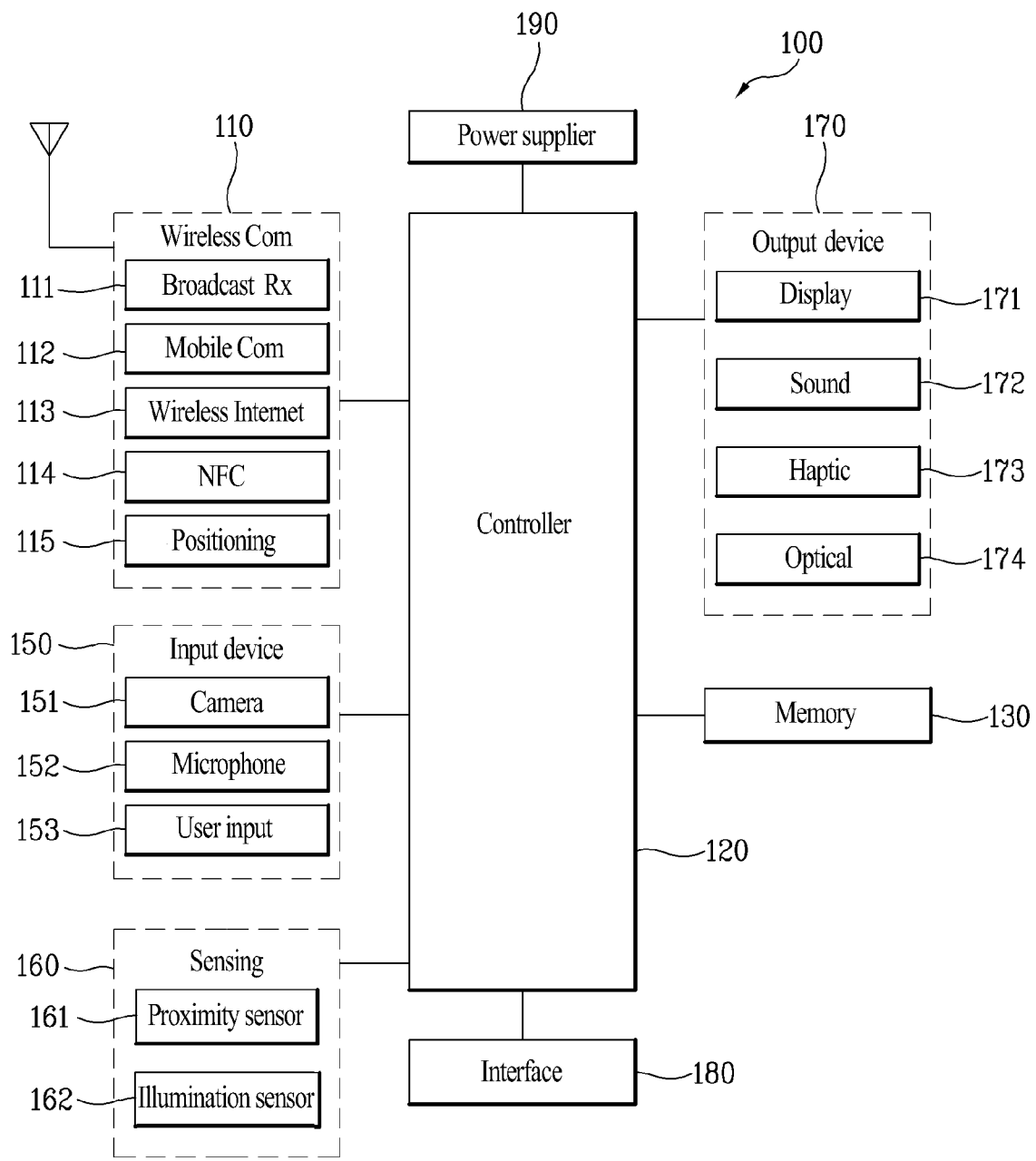
FIG. 14 illustrates a more specific block diagram of the device to which the present disclosure is applicable.

FIG. 14 illustrates a more specific block diagram of a device to which the present invention may be applied.

The device 100 may include a memory 130 and a controller (or processor) 120, and may optionally further include at least one of a wireless communication device 110, an input device 150, a sensing device 160, an output device 170, an interface controller 180, and a power supplier 190. The components shown in FIG. 14 are not essential to implementing the device 100. Thus, the device to which the method described herein is applied may have more or fewer components than those listed above.

More specifically, the wireless communication device 110 of the components may include one or more modules that enable wireless communication between the device 100 and the wireless communication system, between the device 100 and another device 100, or between the device 100 and an external server. In addition, the wireless communication device 110 may include one or more modules for connecting the device 100 to one or more networks.

The wireless communication device 110 may include at least one of a broadcast receiving module 111, a mobile communication module 112, a wireless Internet module 113, a near-field communication (NFC) module 114, and a positioning information module 115.

The input device 150 may include a camera 151 or an image input device configured to input an image signal, a microphone 152 or an audio input device configured to input an audio signal, or a user input device 153 (e.g., a touch keys, a mechanical key, and the like) configured to receive information from a user. The audio data or the image data collected through the input device 150 may be analyzed and processed into a user's control instruction.

The sensing device 160 may include one or more sensors configured to sense at least one of information within the device, information about the surrounding environment surrounding the device, and user information. For example, the sensing device 160 may include at least one of a proximity sensor 161, an illumination sensor 162, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g. see the camera 151), a microphone 152), a battery gauges, an environmental sensor (e.g. a barometer, a hygrometer, a thermometer, a radiation detection sensor, a thermal sensor, a gas sensor, etc.), and a chemical sensor (e.g., a electronic nose, a healthcare sensor, a biometric sensor, etc.). The device disclosed herein may combine and utilize information sensed by at least two or more of these sensors.

The output device 170, which is used to generate an output related to sight, hearing, or tactile sense, may include at least one of a display 171, a sound output device 172, a haptic module 173, and an optical output device 174. The display 171 may form a layer structure with or is integrated with the touch sensor, thereby implementing a touch screen. The touch screen may function as a user input device 153 that provides an input interface between the device 100 and the user, and may also provide an output interface between the device 100 and the user.

The interface controller 180 serves as a path to various types of external devices connected to the device 100. The interface controller 180 may include at least one of a wired/wireless headset port, an external charger port, a wired/wireless data port, a memory card port, a port configured to connect a device equipped with an identification module, an audio input/output (I/O) port, a video input/output (I/O) port, and an earphone port. In response to connection of an external device to the interface controller 180, the device 100 may perform appropriate control related to the connected external device.

In addition, the memory 130 stores data supporting various functions of the device 100. The memory 130 may store a plurality of application programs (or applications) that are driven by the device 100, data for operation of the device 100, and instructions. At least some of these applications may be downloaded from an external server via wireless communication. In addition, at least some of these application programs may exist on the device 100 from the time of shipment to enable basic functions (e.g., call reception, call transmission, message reception, and message transmission) of the device 100. The application program may be stored in the memory 130, installed on the device 100, and driven by the controller 120 to perform an operation (or function) of the device 100.

In addition to the operation related to the application program, the controller 120 typically controls the overall operation of the device 100. The controller 120 may provide appropriate information or functions to a user or process the same by processing signals, data, information, and the like, which are input or output through the above-described components, or by driving an application program stored in the memory 130.

In addition, the controller 120 may control at least some of the components described with reference to FIG. 14 in order to drive an application program stored in the memory 130. Further, the controller 120 may combine and operate at least two of the components included in the device 100 to drive the application program.

The power supplier 190 is supplied with power from an external power source or an internal power source under control of the controller 120 to supply power to each component included in the device 100. The power supplier 190 may include a battery, which may be a built-in battery or a replaceable battery.

At least some of the above-described components may operate in cooperation with each other to implement an operation, control, or control method of the device according to the present invention. In addition, the operation, control, or control method of the device 100 may be implemented on the device 100 by driving at least one application program stored in the memory 130.

Example of Wireless Device Applied to the Present Disclosure

Figure 15:
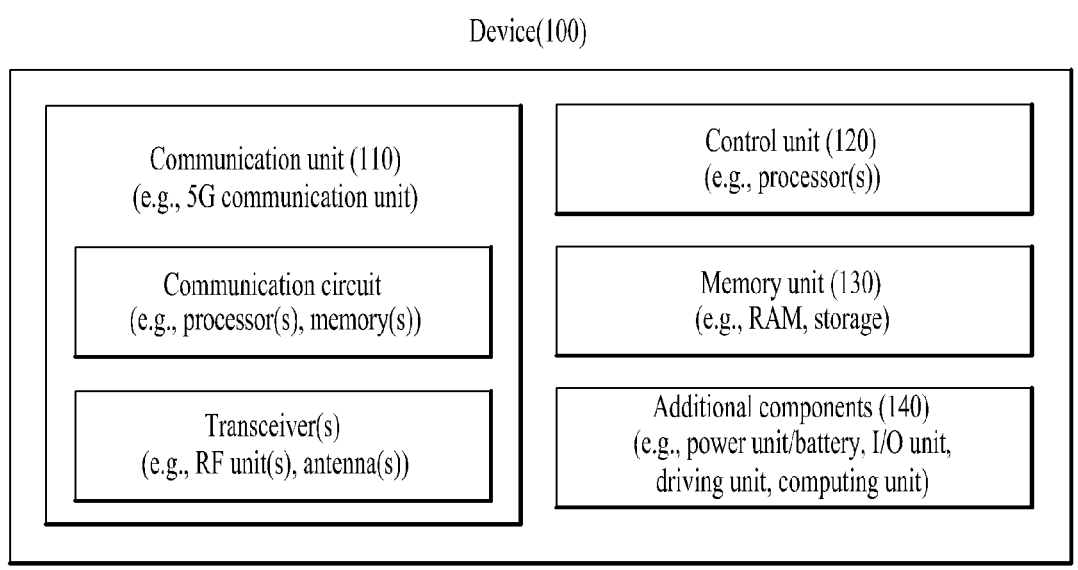
FIG. 15 shows another example of a wireless device applied to the present disclosure.

FIG. 15 illustrates another example of a wireless device applied to the present disclosure. The wireless device may be implemented in various forms according to a use-case/service.

Referring to FIG. 15, wireless device 100 may be configured by various elements, components, units/portions, and/or modules. For example, each of the wireless devices 100 and 200 may include a communication unit 110, a control unit 120, a memory unit 130, and additional components 140. The communication unit may include a communication circuit and transceiver(s). For example, the communication circuit may include one or more processors and/or one or more memories. For example, the transceiver(s) may include one or more transceivers and/or one or more antennas. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, a robot, vehicles, an XR device, a hand-held device, a home appliance, an IoT device, a digital broadcast terminal, a hologram device, a public safety device, an MTC device, a medicine device, a fintech device (or a finance device), a security device, a climate/environment device, an AI server/device, a base station, a network node, etc. The wireless device may be used in a mobile or fixed place according to a use-example/service.

In FIG. 15, the entirety of the various elements, components, units/portions, and/or modules in the wireless device 100 may be connected to each other through a wired interface or at least a part thereof may be wirelessly connected through the communication unit 110. For example, in each of the wireless device 100, the control unit 120 and the communication unit 110 may be connected by wire and the control unit 120 and first units (e.g., 130 and 140) may be wirelessly connected through the communication unit 110. Each element, component, unit/portion, and/or module within the wireless device 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Example of Hand-Held Device Applied to the Present Disclosure

Figure 16:
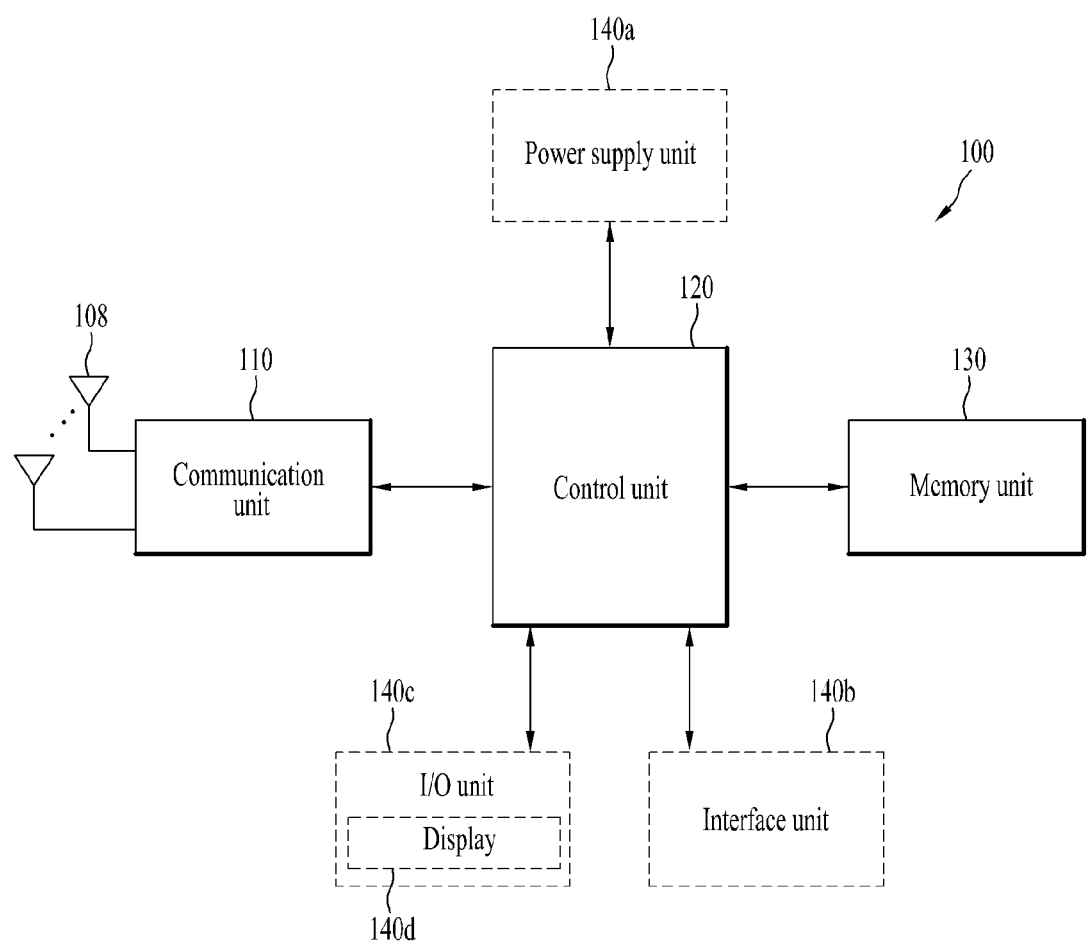
FIG. 16 illustrates a hand-held device applied to the present disclosure.

FIG. 16 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 17:
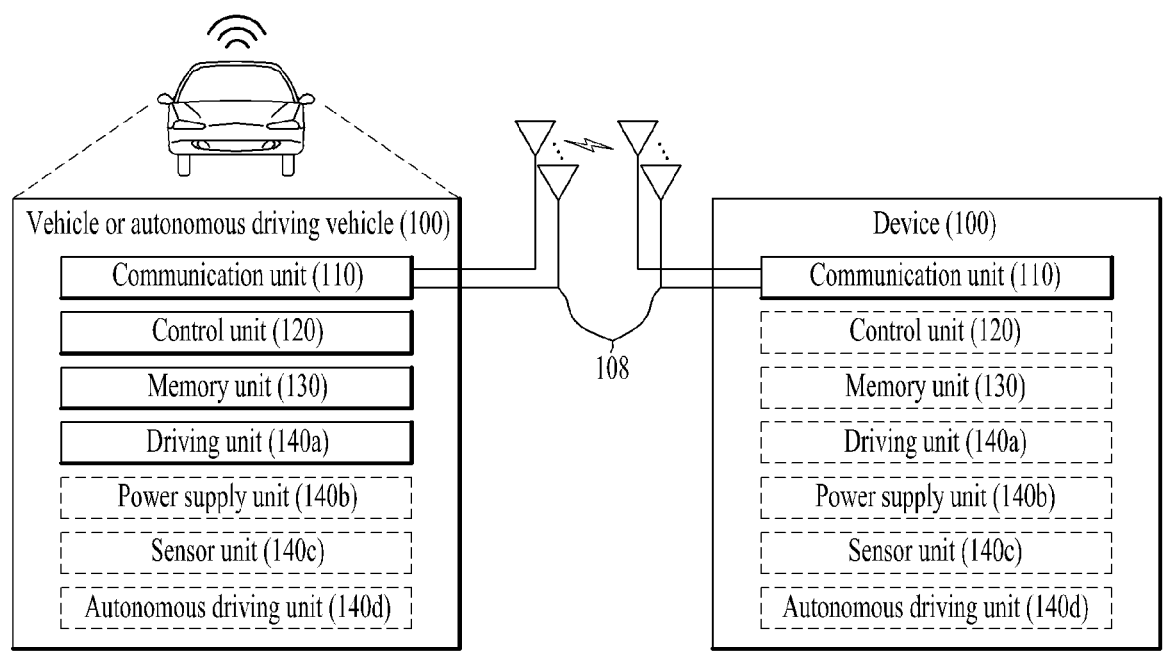
FIG. 17 illustrates a vehicle or autonomous vehicle applied to the present disclosure.

Example of Vehicle or Autonomous Driving Vehicle Applied to the Present Disclosure FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Example of Vehicle Applied to the Present Disclosure

Figure 18:
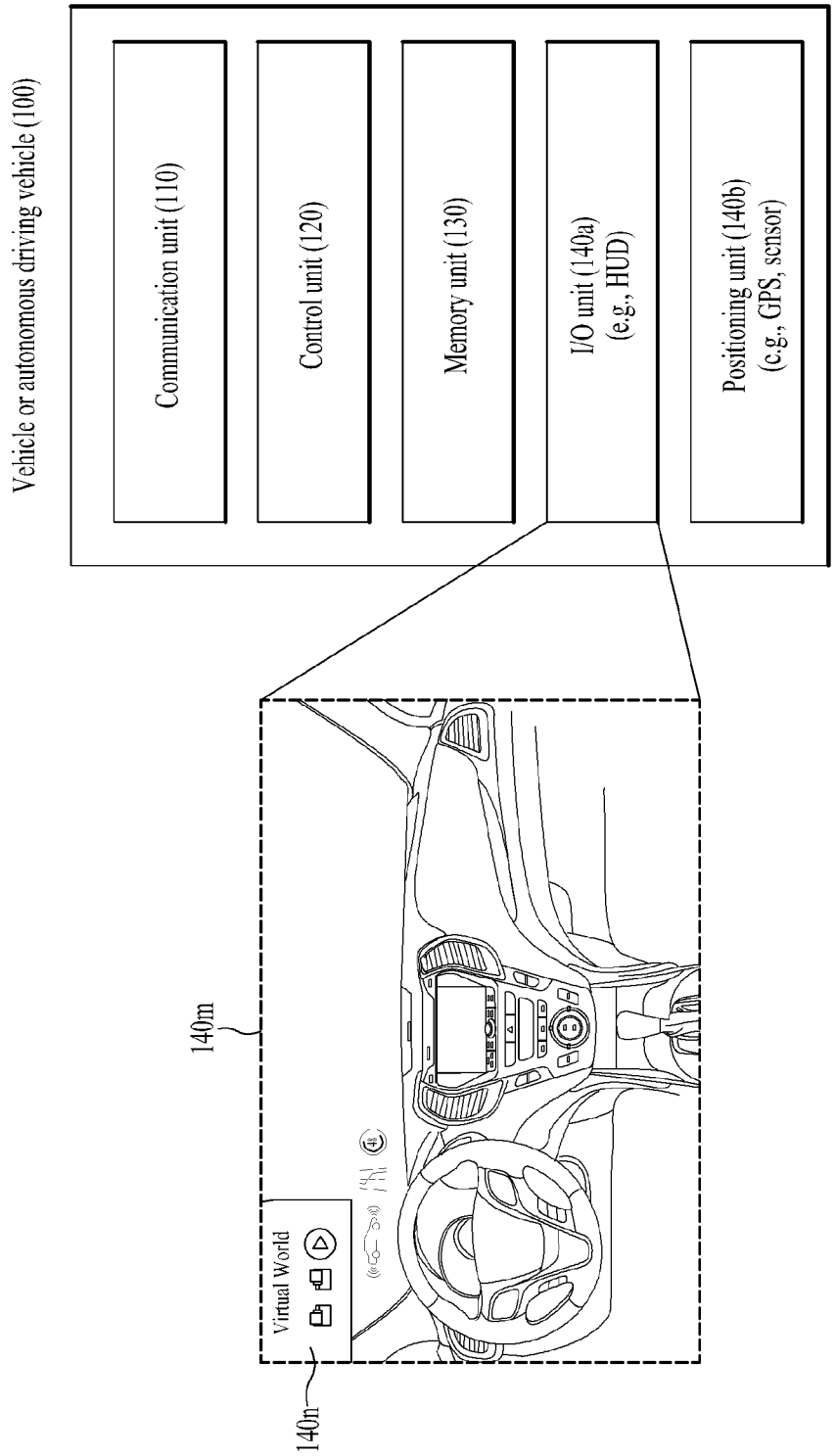
FIG. 18 illustrates a vehicle applied to the present disclosure.

FIG. 18 illustrates a vehicle applied to the present disclosure. The vehicle may be implemented as a transport means, an aerial vehicle, a ship, etc.

Referring to FIG. 18, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 15.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Example of XR Device Applied to the Present Disclosure

Figure 19:
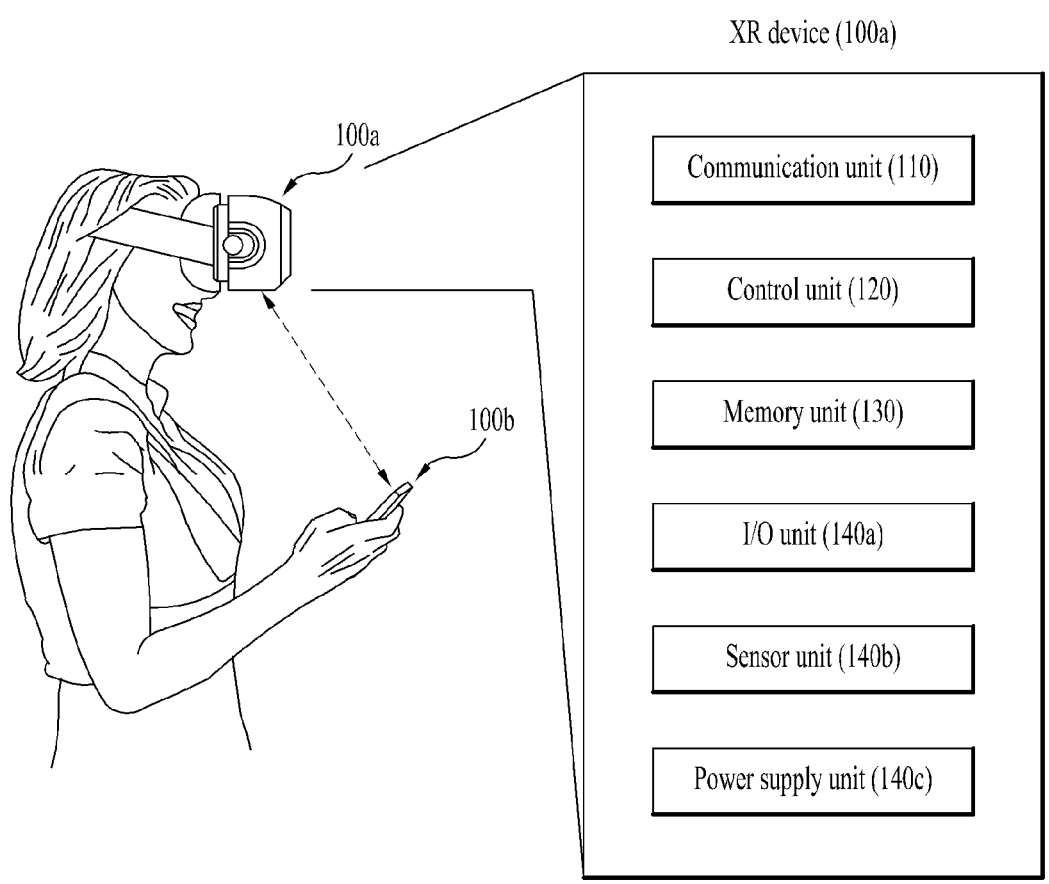
FIG. 19 illustrates an XR device applied to the present disclosure.

FIG. 19 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 19, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 15, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Example of AI Device Applied to the Present Disclosure

Figure 20:
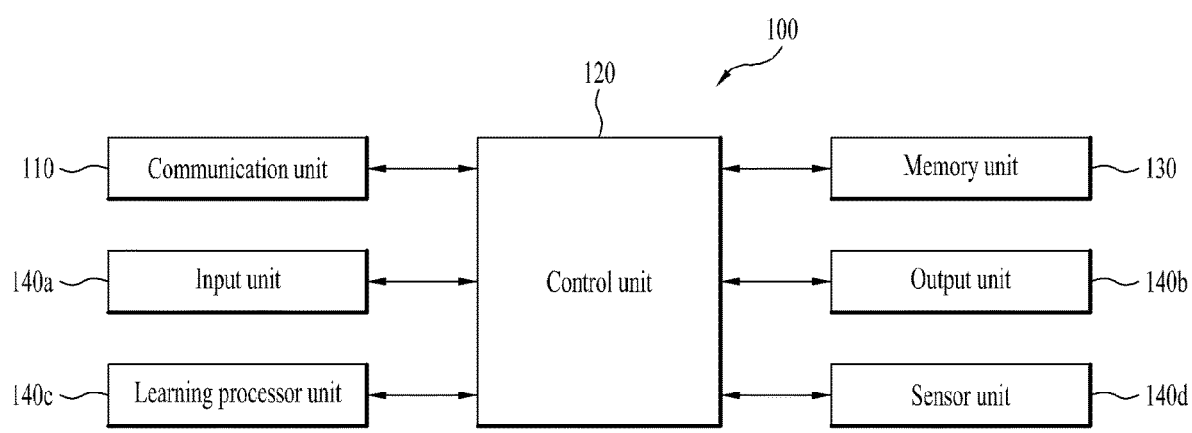
FIG. 20 illustrates an artificial intelligence (AI) device applied to the present disclosure.

FIG. 20 illustrates an AI device applied to the present invention. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 20, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 15, respectively.

The communication unit 110 may transmit and receive wired/radio signals (e.g., sensor information, user input, learning models, or control signals) to and from external devices such as other AI devices or an AI server using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server. The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server. The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of processing a multimedia signal by an apparatus, the method comprising:

obtaining at least one video object from the multimedia signal and at least one audio object from the multimedia signal, wherein the at least one video object represents a face;

extracting video feature information for the at least one video object and audio feature information for the at least one audio object;

determining a correlation between the at least one video object and the at least one audio object through an object matching engine based on the video feature information and the audio feature information; and based on the correlation, controlling output of left and right audio signals for sound image localization at a screen location of the at least one video object with respect to a listener, wherein the video feature information is extracted based on:

a ratio between a distance between a top boundary of a first rectangular region including the face and a top boundary of a second rectangular region including lips within the first rectangular region, a height of the second rectangular region, and a distance between a bottom boundary of the second rectangular region and a bottom boundary of the first rectangular region; and a ratio between a distance between a left boundary of the second rectangular region and a left boundary of the first rectangular region, a width of the second rectangular region, and a distance between a right boundary of the second rectangular region and a right boundary of the first rectangular region.

2. The method of claim 1, wherein determining the correlation between the at least one video object and the at least one audio object comprises:

obtaining information about a relationship between each of the at least one video object and a specific audio object of the at least one audio object through the object matching engine based on the video feature information and the audio feature information; and determining, from among the at least one video object, a specific video object related to the specific audio object based on the information about the relationship between each of the at least one video object and the specific audio object.

3. The method of claim 2, wherein determining the specific video object related to the specific audio object comprises:
based on a value of the information about the relationship being greater than a predetermined value, determining a video object related to the value of the information about the relationship as the specific video object.

4. The method of claim 3, wherein determining the specific video object related to the specific audio object further comprises:
based on the least one video object comprising a plurality of video objects, determining, from among the plurality of video objects, a video object related to a greatest value of the information about the relationship as the specific video object.

5. The method of claim 2, wherein determining the specific video object related to the specific audio object comprises:
based on a value of the information about the relationship being less than a predetermined value, determining a video object related to the value of the information about the relationship as the specific video object.

6. The method of claim 5, wherein determining the specific video object related to the specific audio object further comprises:
based on the least one video object comprising a plurality of video objects, determining, from the plurality of video objects, a video object related to a smallest value of the information about the relationship as the specific video object.

7. The method of claim 2, wherein the information about the relationship has a real number value.

8. The method of claim 1, wherein the video feature information is extracted based on a vertical length and a horizontal length of a lip skeleton.

9. The method of claim 1, wherein the audio feature information is extracted based on linear prediction coding (LPC).

10. The method of claim 1, wherein the audio feature information is extracted based on a log-Mel filters-of-bank.

11. The method of claim 1, wherein the audio feature information is extracted based on Mel-frequency cepstral coefficients (MFCC).

12. The method of claim 1, wherein the audio feature information comprises onset information about the at least one audio object.

13. The method of claim 1, wherein the object matching engine comprises a model trained based on learning.

14. An apparatus configured to process a multimedia signal, the apparatus comprising:
a memory storing instructions; and
at least one processor operatively coupled to the memory and configured to, when executing the instructions, implement operations comprising:
obtaining at least one video object from the multimedia signal and at least one audio object from the multimedia signal, wherein the at least one video object represents a face;
extracting video feature information for the at least one video object and audio feature information for the at least one audio object;
determining a correlation between the at least one video object and the at least one audio object through an object matching engine based on the video feature information and the audio feature information; and
based on the correlation, controlling output of left and right audio signals for sound image localization at a screen location of the at least one video object with respect to a listener,
wherein the video feature information is extracted based on:
a ratio between a distance between a top boundary of a first rectangular region including the face and a top boundary of a second rectangular region including lips within the first rectangular region, a height of the second rectangular region, and a distance between a bottom boundary of the second rectangular region and a bottom boundary of the first rectangular region; and
a ratio between a distance between a left boundary of the second rectangular region and a left boundary of the first rectangular region, a width of the second rectangular region, and a distance between a right boundary of the second rectangular region and a right boundary of the first rectangular region.

15. The apparatus of claim 14, wherein determining the correlation between the at least one video object and the at least one audio object comprises:
obtaining information about a relationship between each of the at least one video object and a specific audio object of the at least one audio object through the object matching engine based on the video feature information and the audio feature information; and
determining, from among the at least one video object, a specific video object related to the specific audio object based on the information about the relationship between each of the at least one video object and the specific audio object.

16. The apparatus of claim 15, wherein determining the specific video object related to the specific audio object comprises:
based on a value of the information about the relationship being greater than a predetermined value, determining a video object related to the value of the information about the relationship as the specific video object.

17. The apparatus of claim 16, wherein determining the specific video object related to the specific audio object further comprises:
based on the least one video object comprising a plurality of video objects, determining, from among the plurality of video objects, a video object related to a greatest value of the information about the relationship as the specific video object.

18. The apparatus of claim 15, wherein determining the specific video object related to the specific audio object comprises:
based on a value of the information about the relationship being less than a predetermined value, determining a video object related to the value of the information about the relationship as the specific video object.

19. The apparatus of claim 18, wherein determining the specific video object related to the specific audio object further comprises:
based on the least one video object comprising a plurality of video objects, determining, from the plurality of video objects, a video object related to a smallest value of the information about the relationship as the specific video object.

* * * * *